Patented June 7, 1949

2,472,775

UNITED STATES PATENT OFFICE 2,472,775

METHOD OF TREATING POTATOES

Joseph F. P. Newhall, St. Petersburg, Fla., assignor to S. C. Johnson & Son, Inc., Racine, Wis.

No Drawing. Application September 27, 1946, Serial No. 699,639

1 Claim. (Cl. 99—168)

This invention relates to a composition and method of treating potatoes. More particularly, it relates to an improved method of treating potatoes by the use of an aqueous wax emulsion containing methyl ester of alpha-naphthaleneacetic acid.

The application of a wax coating to fruits and vegetables, such as lemons, oranges, tomatoes and the like has become a well-established commercial practice. In order to provide the surfaces of these perishables with a pronounced gloss or shine, as well as to preserve them, it has long been common practice to employ carnauba wax or mixtures of carnauba with paraffin. Various wax-containing compositions have been applied to these products by dipping, spraying or other known methods. If a hydrocarbon type of liquid wax is applied, the product will require rubbing or brushing to produce a glossy coating. In emulsion form, the carnauba containing wax composition gives a glossy coating merely upon drying with little or no rubbing or brushing of the dried coating.

Heretofore, potatoes have not been wax-treated since the hydrocarbon type of liquid wax will generally leave an offensive odor and taste due to the porosity of the potato skin, and ordinary methods of applying an aqueous wax emulsion would require too costly equipment, since the resulting treatment was primarily to improve the sales or "eye appeal" of the potatoes.

Prior investigators have investigated the use of plant hormones to inhibit growth of buds on various plants. Professors J. E. Thomas and A. J. Riker in an article appearing in the American Potato Journal entitled "Sprouting of Potatoes Inhibited by Plant Hormones" report exhaustive tests showing the effectiveness of the methyl ester of alpha-naphthaleneacetic acid in inhibiting the sprouting of potatoes stored in a temperature of over 21° C., (70° F.). However, no commercially feasible method of application was proposed. Although a dusting treatment is suggested, it is pointed out the housewife could object to the dust on the potatoes. Packing the potatoes with impregnated shredded paper is also suggested, but the writers point out that this treatment would be objectionable in the potato peeling machines.

Now, in accordance with my invention, I have developed an improved composition for treating potatoes, which comprises an aqueous wax emulsion which contains methyl ester of alpha-naphthaleneacetic acid. This composition not only provides a glossy wax coating to the potatoes which preserves them, but the incorporation of this hormone in an aqueous wax emulsion will inhibit the sprouting of the potatoes when stored in a temperature of over 21° C., (70° F.). A convenient method of applying the wax emulsion is in the form of a foam.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

An aqueous wax emulsion was prepared by melting 448 parts candelilla wax, 448 parts microcrystalline paraffin, 162 parts oleic acid and 24 parts methyl ester of alpha-naphthaleneacetic acid in a suitable vessel by heating to about 200° F. An aqueous solution of sodium hydroxide was prepared by dissolving 7.35 parts sodium hydroxide in water. The aqueous sodium hydroxide was then added to the melted waxes with stirring. There was then added 61.8 parts triethanolamine and the mixture cooked at a temperature of about 200° F. for a period of 15–20 minutes and water was slowly added at a rate so as to maintain a transparent gel during the time the gel continued to absorb the water. The addition of the water is continued at this rate until the gel breaks. The emulsion was then diluted with additional water until the total water content of the emulsion was 2,950 parts. This emulsion contained about 28% solids.

Example 2

The emulsion of Example 1 was then diluted at a rate of 4 parts of water to 1 part of emulsion to a total solids content of about 5.6 of which the methyl ester of alpha-naphthaleneacetic acid was about 0.6% by weight. Potatoes were treated with this emulsion and after three months in common storage at a temperature in excess of 70° F. it was found that a 100 pound bag of treated potatoes had a total of 2 pounds of sprouts, while an untreated bag of potatoes from the same source had 11 pounds of sprouts. In addition, the treated potatoes had improved sales or "eye appeal."

Example 3

An aqueous wax emulsion may be prepared by melting 136.5 parts carnauba wax and 5.6 parts methyl ester of alpha-naphthaleneacetic acid in a suitable vessel by heating to about 200° F. There may then be added 27 parts of oleic acid followed by 12.4 parts of morpholine. The temperature is then maintained at about 200° F. and water should slowly be added at a rate so as to maintain a transparent gel during the time the gel continues to absorb the water. The addition of water is continued at this rate until the gel breaks. The emulsion should then be diluted until the total water content of the emulsion is about 680 parts. This emulsion when diluted with 4 parts of water per part of emulsion is an efficient potato preservative composition, imparting a pronounced gloss to the skin of the potato, as well as inhibiting the loss of moisture of the potato, and sprouting.

Although carnauba and a mixture of candelilla and microcrystalline paraffin waxes were used in the examples, other waxes, resins and mixtures thereof may be used either in toto or in part.

While the temperature of 200° F. was used in the examples in the preparation of the emulsions, this temperature may be varied over a wide range as taught by the art.

A variety of emulsifying agents may be used, and although morpholine and triethanolamine were used in the examples, this is not intended to be a limitation on the use of other known wax emulsifying agents.

The amount of methyl ester of alpha-naphthaleneacetic acid may vary, but a concentration of from about 0.2% to 0.6% by weight of the emulsion is recommended. Less than 0.2% may be used, if desired, but amounts of more than 0.6% appear no more effective than amounts within the recommended range.

The active agent, the methyl ester of alpha-naphthaleneacetic acid, may be added to the emulsion at various stages of preparation. As shown in Example 1, it may be added to the molten waxes; it may be added after the emulsion has been formed; or during various other stages in the preparation of the emulsion.

In carrying out this invention, the wax emulsion containing methyl ester of alpha-naphthaleneacetic acid may be applied to the potatoes by spraying, dipping or other known manners. However, a preferred method is to place the emulsion containing the desired concentration of methyl ester of alpha-naphthaleneacetic acid in a reservoir or tank adjacent to an installation where potatoes are to be treated. The potatoes are preferably washed and dried and are moved along a line by conveyor belts or rollers or other well-known methods. The emulsion is agitated in the reservoir by known agitating means, such as by mechanical agitation, or by means of compressed air being introduced into the emulsion. As the foam builds up, it overflows and drops on to the potatoes. The potatoes are then contacted with a plurality of wiper blades or rolls which wipe the foam uniformly on the surface of the potatoes. As a result the potatoes are coated with a thin coating of wax emulsion containing the desired amount of active agent which inhibits the potatoes from sprouting.

There are a number of definite advantages in applying the wax emulsion containing the active agent heretofore disclosed in the form of foam such as:

1. By this method the potatoes never enter or come in contact with the main quantity of emulsion and therefore, none of the active agent is utilized or neutralized until it is actually deposited on the surface of the perishable.

2. Because the potatoes do not pass through or come in contact with the main body of treating emulsion, any water which might otherwise be carried into the treating solution has no opportunity of diluting the emulsion and the effective concentration of active agent contained therein.

3. If a substantial quantity of water is being carried on the potatoes being treated, it is possible to adjust the concentration of the wax in the treating tank and the active agent as well, so that an optimum amount will be applied to the potatoes irrespective of the presence of the water.

It will thus be seen, that in accordance with my invention, an efficient commercial method of treating potatoes has been developed. The composition not only will impart sales or "eye appeal" to the potatoes, but will preserve them and inhibit the growth of sprouts when stored at over 21° C., (70° F.).

Other modes of applying the principle of the invention may be employed instead of those explained, change being made as regards the method herein disclosed, provided the step or steps stated by the following claim or the equivalent of such stated step or steps be employed.

I claim:

A method of treating a potato to inhibit shrinkage and sprouting thereof during storage comprising adding methyl ester of alpha naphthaleneacetic acid to aqueous wax emulsion, agitating the wax emulsion sufficiently to form a foam, and applying the foam directly to said potato, forming a water-insoluble wax coating on the surface of said potato, said coating retaining said ester in direct contact with said potato while inhibiting the vaporization thereof.

JOSEPH F. P. NEWHALL.

REFERENCES CITED

The following references are of record in the file of this patent:

UNITED STATES PATENTS

| Number | Name | Date |
|---|---|---|
| 2,186,691 | Belzer | Jan. 9, 1940 |
| 2,332,128 | Blondon | Oct. 19, 1943 |
| 2,341,868 | Hitchcock et al. | Feb. 15, 1944 |